Patented Aug. 28, 1951

2,565,931

UNITED STATES PATENT OFFICE 2,565,931

METHOD OF FORMING ALKALINE EARTH METAL AND MAGNESIUM SULPHIDES

Mahlon J. Rentschler, Willoughby, Ohio; Delia J. Rentschler, executrix of said Mahlon J. Rentschler, deceased, assignor to Albert Pavlik, Willoughby, Ohio No Drawing. Application April 21, 1948, Serial No. 22,511

5 Claims. (Cl. 23—134)

This invention relates to the formation of metal sulphides, especially to the formation of relatively pure sulphides of the alkaline earth metals and magnesium.

Many methods for the production of the sulphides of the alkaline earths and magnesia have been proposed in chemical literature. The most common commercial method for producing the sulphides of barium, and strontium is the so-called "black ash" process. The ordinary commercial operation for carrying out this process consists in subjecting the natural sulphates of these elements to the action of carbon at high temperatures. This method is not satisfactory where a pure product is desired because the impurities contained in the ores used are contained in the finished products. Among these impurities are silica, iron oxides, aluminum oxide, etc., contained in the natural ores as well as in the commercial carbons used for the reduction. Instead of using the natural sulphate ores and impure carbons it is possible to use the purified sulphates and pure carbons. The resulting products are still impure because it is necessary to use carbon in excess quantities in order to secure a complete reduction and this excess of carbon pollutes the finished product. For this reason the sulphides found on the market manufactured by this process are generally described as gray or black depending upon the excess carbon used in the reduction. If the reduction is incomplete, unconverted barium sulphate is also present as an impurity in these products. Furthermore, there is also produced in practice of the above process, a certain percent of barium carbonate which contaminates the finished sulphide.

It also is not possible to produce pure calcium sulphide by any known process whereas no one, insofar as I am aware, is able to supply a stable magnesium sulphide.

The general object of this invention is to provide a process for producing relatively pure metal sulphides of the alkaline earths and magnesium.

Another object of the invention is to provide a process for the manufacture of metal sulphides by a quantitative reaction.

A further object is to produce sulphides which are stable at high temperatures and which do not oxidize appreciably at ordinary room temperatures, when kept dry.

Another object of the invention is to produce a stable magnesium sulphide by a commercial process.

Yet a further object of the invention is to produce metal sulphides by an uncomplicated, easily controlled process wherein excessive heating of the reaction mixture and/or reaction products is not detrimental.

The foregoing and other objects and advantages of the invention will be made apparent as the specification proceeds.

I have found that instead of using the sulphates of the metals from which the sulphides are to be formed, that if the carbonates of the materials in question are used and heated in direct contact with sulphur, then a direct production of a relatively pure sulphide can be achieved. The metallic carbonates are artificially formed materials and are purer than the sulphates used in previous types of sulphide-forming processes. Even if the purified sulphates and pure carbons are used in the "black ash" process, the carbon will still be present in the end product. In practice of the present invention, the carbonate is intimately mixed with sulphur in a ball mill or other suitable mixer, after which the mixture is heated or fired in a suitable container to a temperature of above 1000° C. This heating or firing operation is continued until the chemical reaction of the components of the mixture is driven to completion. The ingredients react as follows: $XCO_3 + 2S = XS + CO + SO_2$. X in the foregoing formula may be barium, strontium, calcium or magnesium, and it has further been found that the above reaction is quantitative whereby molecular weights of the materials can be used to form a corresponding molecular weight amount of the metallic sulphide.

As an illustration, if it is desired to produce pure strontium sulphide, the starting material would be strontium carbonate and the resultant sulphide would be strontium sulphide. This reaction then is best produced by mixing 147.64 parts by weight of pure strontium carbonate with 64.12 parts by weight of pure sulphur. Inasmuch as the secondary products from the above reaction are the gases, carbon monoxide and sulphur dioxide plus the desired solid sulphide, the gases pass out of the reaction chamber as the gases are formed, and the metallic sulphide remains.

Without any further processing, the metallic sulphide is ready for use, after it is cooled.

One of the essential steps in the above process is that the reacting materials be heated to a temperature high enough to reduce any carbon dioxide produced to carbon monoxide, so that the above reaction will occur as outlined. The temperature required to achieve this complete reduction of carbon dioxide is about 1000° C. (1832° F.)

so that the heating operation must produce this, or a higher temperature, throughout the entire mass that is being reacted together. Temperatures up to 2500° F. have been used and have not decomposed the sulphides produced. The sulphides produced are of relatively high purity since sulphides with 90% or more of the desired sulphide material have been consistently achieved by practice of this invention using commercial raw materials. Furthermore, the end products are free from caustic oxides and thus much less harmful to the human skin than sulphides produced by other known processes, since such sulphides usually contain caustic oxides. Due to the greater concentration of sulphide in the end product in relation to the composition of sulphides produced by other methods, the product of the invention is much more effective in its action. Furthermore, sulphides of the invention are free from polysulphides; and also do not contain free sulphur if the reaction is carried to completion.

Further advantages of the sulphides manufactured by the process of this invention are that such sulphides are stable at high temperatures and do not oxidize appreciably at ordinary temperatures if kept dry. The products are uniform in their chemical composition since their reaction is quantitative. The end products are of high purity due to the purifying action of the high operative temperatures used and due to consumption of all of the starting material in the reaction of the invention. No harm is done by excessive heating of the reaction vessel after the chemical action has been completed so that it is desirable to continue the reaction until it is definitely proceeded to completion.

"Pure" in this specification is used in a relative sense and does not mean 100% concentration of a material referred to as being pure, but it does denote that such material is relatively pure in comparison with similar materials heretofore produced.

The results of practice of the invention are repetitive and can be duplicated by use of similar operating conditions at different times.

While one complete embodiment of the invention has been disclosed herein, it will be appreciated that modification of this particular embodiment of the invention may be resorted to without departing from the scope of the invention as defined by the appended claims.

What is claimed is:

1. That method of forming relatively pure metallic sulphides comprising the steps of intimately mixing sulphur with a carbonate of a material from the group consisting of the alkaline earth metals and magnesium in a ratio of exactly two molecular weights of sulphur and one of the carbonate, heating the mixture to a temperature above 1000° C. until a complete reaction between the components of the mixture is effected to produce a metal sulphide, carbon monoxide, and sulphur dioxide with the carbon monoxide and sulphur dioxide passing off as gases, and cooling the sulphide of said metal.

2. That method of forming a metallic sulphide comprising the steps of intimately mixing sulphur with only a carbonate of a material from the group consisting of the alkaline earth metals and magnesium, heating the mixture to a temperature above 1000° C. until a complete reaction between the components of the mixture is effected to produce a metal sulphide, carbon monoxide, and sulphur dioxide, and cooling the sulphide of said metal.

3. That method of forming a metallic sulphide comprising the steps of intimately mixing sulphur with a carbonate of a material from the group consisting of the alkaline earth metal and magnesium in a ratio of about two molecular weights of sulphur and one of the carbonate and heating the mixture to a temperature high enough to form carbon monoxide and a sulphide of said metal.

4. That method of forming a metallic sulphide comprising the steps of intimately mixing sulphur with a carbonate of a material from the group consisting of the alkaline earth metals and magnesium in a ratio of about two molecular weights of sulphur to one of the carbonate, heating the mixture to a temperature above 1000° C. to produce a reaction between the components of the mixture and form a sulphide of said metal.

5. That method of forming relatively pure metallic sulphides comprising the steps of intimately mixing sulphur with a carbonate of a material from the group consisting of the alkaline earth metals and magnesium in a ratio of exactly two molecular weights of sulphur and one of the carbonate, and heating the mixture to a temperature above 1000° C. until a complete reaction between the components of the mixture is effected to produce a sulphide of said metal, carbon monoxide, and sulphur dioxide with the carbon monoxide and sulphur dioxide passing off as gases.

MAHLON J. RENTSCHLER.

REFERENCES CITED

The following references are of record in the file of this patent:

UNITED STATES PATENTS

| Number | Name | Date |
| --- | --- | --- |
| 1,044,452 | Halland | Nov. 12, 1912 |
| 2,090,446 | Gardner et al. | Aug. 17, 1937 |
| 2,223,631 | MacMullin | Dec. 3, 1940 |
| 2,358,661 | Sarge | Sept. 19, 1944 |
| 2,492,716 | Sprague | Dec. 27, 1949 |

OTHER REFERENCES

"Chemical and Biological Laboratory Apparatus," Catalog C–227, Central Scientific Co., Chicago, Ill., 1927, pages 705–735.